US008819628B2

(12) United States Patent
Raj

(10) Patent No.: US 8,819,628 B2
(45) Date of Patent: Aug. 26, 2014

(54) PRODUCT LOCALIZATION DEVICE AND METHOD

(75) Inventor: Apurv Raj, Hyderabad (IN)

(73) Assignee: CA, Inc., Islandia, NY (US)

( * ) Notice: Subject to any disclaimer, the term of this patent is extended or adjusted under 35 U.S.C. 154(b) by 1643 days.

(21) Appl. No.: 12/119,114

(22) Filed: May 12, 2008

(65) Prior Publication Data

US 2009/0282394 A1    Nov. 12, 2009

(51) Int. Cl.
*G06F 9/44* (2006.01)

(52) U.S. Cl.
USPC ........... 717/122; 717/120; 717/111; 717/113; 717/110

(58) Field of Classification Search
None
See application file for complete search history.

(56) References Cited

U.S. PATENT DOCUMENTS

| | | | |
|---|---|---|---|
| 5,664,206 A | 9/1997 | Murow et al. | |
| 6,311,151 B1 | 10/2001 | Yamamoto et al. | |
| 6,782,529 B2 * | 8/2004 | Kumhyr | 717/111 |
| 7,225,222 B1 | 5/2007 | Lu | |
| 8,250,062 B2 * | 8/2012 | Zhang et al. | 707/713 |
| 2006/0277286 A1 | 12/2006 | Zhang et al. | |
| 2007/0033213 A1 | 2/2007 | Bezrukov et al. | |
| 2007/0208997 A1 * | 9/2007 | Jiang et al. | 715/523 |
| 2008/0249760 A1 * | 10/2008 | Marcu et al. | 704/2 |

OTHER PUBLICATIONS

"Connexion Corporate Communications—Automated Translation", http://www.connexion.be/en/hot-banana/automated-translation/, [online]. Connexion Corporation Communications (c) 2005 [retrieved Feb. 15, 2008].,(2005),1 pg.
"Heartsome(r) XLIFF Translation Editor(tm)", http://www.connexion.be/en/hot-banana/automated-translation/, {online]. (c) 2007 Heartsome Holdings Pte. Ltd. [retrieved Feb. 15, 2008]. Retrieved from the Internet:,(2007),2 pgs.

* cited by examiner

*Primary Examiner* — Qamrun Nahar
(74) *Attorney, Agent, or Firm* — Schwegman Lundberg & Woessner, P.A.

(57) ABSTRACT

A system and method for localization facilitates checking resource files in a first format out of a source code management system. Prior stored translated strings are leveraged to produce a partially translated translation memory corresponding to the resource files. Translations of strings are obtained to complete translation of the partially translated translation memory. Translated strings are stored in a database, and the translated resource files in the first format are checked back into the source code management system.

14 Claims, 4 Drawing Sheets

PRODUCT LOCALIZATION DEVICE AND METHOD

BACKGROUND

Computer software is generally written in one country, and reflects local customs, language, user interface constructs and other features that are local to a country or target markets. Localization is a term used to describe the modification of software for use in different countries or for one or more different groups of users to accommodate the language, customs and culture of the individual target markets.

Localization of computer program products generally includes translating software messages, menus, documentation and packaging, changing the time, date, decimal and currency formats, changing comparison and sorting routes, changing character sets, input methods and keyboard layouts, changing displayable and printable fonts, and printing devices, modifying input and output software routines to display, enter and print diverse single and multi-byte character sets; and accommodating local laws and customs.

Different cultures and countries have different rules for punctuation, word order, sorting, the order of items in addresses, currency measures and conversions, number formats and other local idiosyncrasies. Many native languages and customs have different meanings for certain symbols used as computer icons as well as colors which may be used to indicate some special meaning. Localization of a computer product from one locale to another to accommodate such differences may involve translation of the software documentation into the new language, translation of the textual messages embedded in the software into the new language, incorporation of additional software facilities to make input and output of the new language and perhaps new characters possible, adapting the software to accommodate the customs and conventions of the new locale, and testing and assurance that the modified product works as intended.

SUMMARY

A system and method for localization facilitates checking resource files in a first format out of a source code management system. Prior stored translated strings are leveraged to produce a partially translated translation memory corresponding to the resource files. Translations of strings are obtained to complete translation of the partially translated translation memory. Translated strings are stored in a database, and the translated resource files in the first format are checked back into the source code management system.

In one embodiment, a machine implemented method includes checking resource files in a first format out of a source code management system, converting the resource files to a common format, such as XML Localization Interchange File Format (XLIFF), creating a translation memory bundle using for example translation memory exchange format (TMX) out of XLIFF files, leveraging prior stored translated strings to produce a partially translated translation memory corresponding to the resource files, obtaining translations of strings via a network to complete translation of the partially translated translation memory, storing translated strings in a database, converting the translated resource files back to the first format, and checking the translated resource files in the first format back into the source code management system.

In a further embodiment, system includes a filter capable of accessing resource files from a source code management system and converting the resource files to a format for transmission via a network. A conversion module that converts the resource files to a XML Localization Interchange File Format (XLIFF).in one embodiment. A memory that stores already translated strings. A module that leverages translated strings from the memory to produce a partially translated translation memory corresponding to the resource files. A translation module that facilitates obtaining translations of strings via a network to complete translation of the partially translated translation memory. The filter converts the translated resource files back to the first format and checks the translated resource files back into the source code management system.

DETAILED DESCRIPTION

Figure 1:
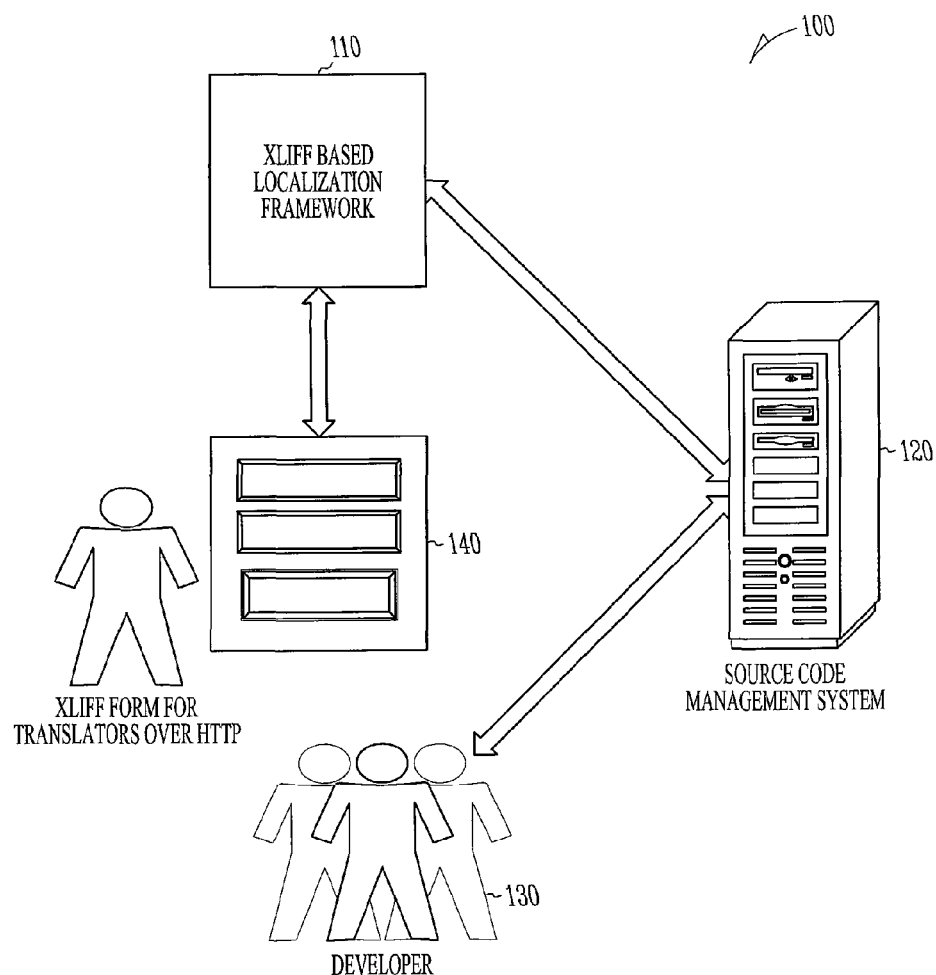
FIG. 1 is a block diagram of a localization system according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. The term "computer readable media" is also used to represent any means by which the computer readable instructions may be received by the computer, such as by different forms of wired or wireless transmissions. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

A localization system and method is used to improve the localization of computer programs so that versions of the programs for different market segments reflect the customs and language of the different market segments. The inventor has recognized that during prior translation workflow, a translation team receives a set localizable resource files, works on it, translates or has it translated in different languages and finally gives it back to development team. There can be many different formats of the resource files. The workflow results in a very error prone process and includes significant overhead. Secondary to that, translators likely do not understand the semantics and syntax of different formats of resource files used in the computer programs. Because of such lack of understanding, translators may make many mistakes which result in compilation and other types of failures.

In addition to the lack of technical understanding on the part of translators, for many developers, localization has been a very vague concept. Developers generally do not seem to appreciate the efforts involved in localization without realizing the fact that the responsibility lies on both translation as well as development to make sure that a product is easily localizable and localized. The system or framework described herein helps ensure that development fulfills certain pre-requisites before they request localization and that a certain set of guidelines if fulfilled.

The localization system may help create a clean process for translation which can remove usual overhead and errors involved in normal translation workflow. The localization system may also provide a better interface for translators who may not know the technical details of resource files.

In one embodiment indicated generally at 100 in FIG. 1, a localization system 110 integrates with a development source code management system 120 accessed by developers 130 who write the source code. The localization system 110 works on standard file formats internally, uses a single format to store translation memory, and creates a database of translations. The localization system also provides translators an interface 140 to facilitate translation of resource files. In addition to that, the localization system 110 may also integrate with other systems via web-services in one embodiment. In one embodiment, the localization system 110 leverages capabilities of XML (extensible markup language).

XML Localization Interchange File Format (XLIFF) is a format for authoring and exchanging the content for localization. In one embodiment, the localization system works on XLIFF file formats internally, and uses TMX (translation memory exchange) format to store translation memory. The localization system creates an XML based database of TMX files and provides translators an interface over HTTP so that they can translate resource files.

Figure 2:
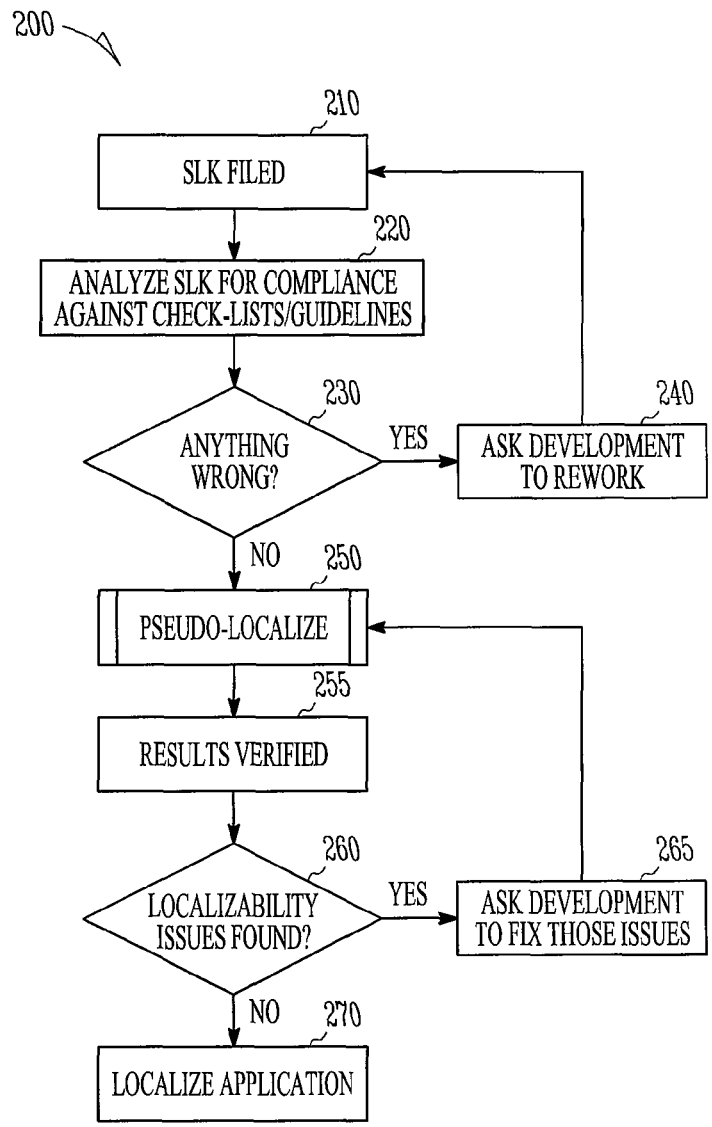
FIG. 2 is a flowchart illustrating a machine assisted method of performing localization of a product according to an example embodiment.

FIG. 2 is a flowchart illustrating a method 200 of preparing software for localization. Method 200 starts with SLK, which stands for software localization kit that contains information as to what are localizable files, their encoding, localizable content, and information related to source code management system 120. Developers 130 fill up an SLK file at 210 and provide it to a localization engineering team at 220. The localization engineering team analyzes the information at 220, finds out if there is any ambiguity, and cross-checks with a localization check-list at 220. If anything is found wrong as indicated at 230, development may be advised to make those changes at 240 in the resource files. Once all the information via the SLK is verified at 230, resource files may be pseudo-localized at 250 using the localization system 110.

In one embodiment, pseudo-localization 250 simulates a localization process. A start and end of a text string is known, and the legibility of the string is preserved. Prefixes and suffixes are added to delineate the string, and vowels may be replaced with accented characters. Both single byte and double byte language may be used.

An example text string may be: "I Agree". Pseudo-localization may begin by replacing the vowels may result in: "Í Àgrêê". Adding the prefix and suffix results in "åëí_I Agree_åëí", or for double byte language: "ㄱㅋ凹_I Agree_ ㄱㅋ凹". This is just one example method of pseudo-localization on one string. Other methods of pseudo-localization may be used, including the use of different accented characters and different start and end delineators.

Development will create the pseudo-localized build, test it to verify the results at 255. If issues are found at 260, development may make necessary changes in the source code at 265 to resolve issues found during pseudo-localization testing, and continue with pseudo-localization at 250 until issues are resolved. Once the issues are resolved at 260, localization may proceed at 270.

Once issues have been resolved, the product is ready for actual localization. The localization system 110, as illustrated in further detail in FIG. 3 provides an interface 310 to check-out localizable resource files 312 from source code management system 120 and create a localization friendly bundle of resource files 312, which in one embodiment is a zip file containing a set of XLIFF files generated from different types of resource files checked out.

Generally, a database 314 of translation strings in a desired format, such as TMX, are leveraged to provide translations for strings that have been processed before. Translation strings may correspond to text associated with user interface constructs, such as check boxes, or may correspond to text associated with lines of forms for a user to fill. Any other text appearing in the product's user interface may be represented as a translation string.

Files that are not completely localized may be translated through linguists 316 over HTTP and finally translated resource files 318 are checked back into source code management system 120 in their original file format. The localization system 110 also has the capability to pseudo-translate resources to find out the degree of localization readiness of source code.

Figure 3:
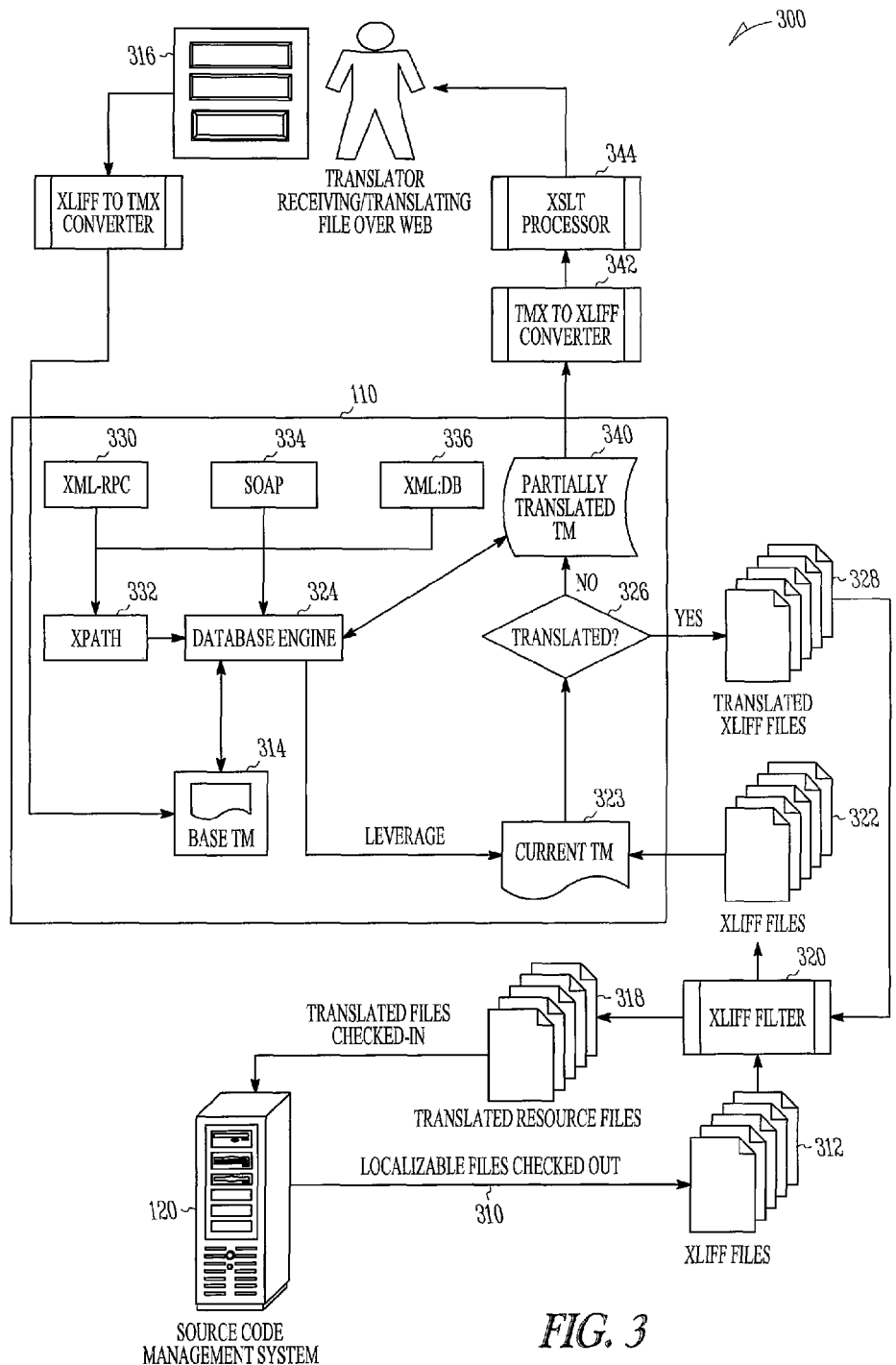
FIG. 3 is a detailed block flow diagram illustrating a method and system for performing localization for one or more products according to an example embodiment.

Referring to FIG. 3 in detail, in one embodiment, resource files 312 are checked from source code management system 120. At 320, an XLIFF filter is used to convert different resource file types into single XLIFF format. Once resource files have been converted to XLIFF format in block 322, diverse XML processing capabilities may be utilized.

Existing translations from previous translation memories stored in database 314 may be leveraged. This may be achieved in one embodiment by use of a database engine 324 used for XML processing. Files from block 322 are converted to current TM format as represented at block 325, which includes leveraged translations from database 314. A check is made at 326 to determine if any string remained untranslated after leverage from database 314. If all the strings are translated, files are converted back to XLIFF files from TMX format. This set of translated XLIFF files is again passed through the XLIFF filter at 320 for converting XLIFF files back to its original format and then files are checked back into the source code management system 120. In one embodiment, translation strings for a product are given identifiers that remain the same for all versions of such strings to allow for easy identification and searching of the database 314.

In one embodiment, only strings previously translated for a particular product are leveraged for that product. This may be done to ensure that a user base that is comfortable with the user interface of a product is not confronted with a translation that may have been appropriate for another user group of a different product, but not for the product being localized. In further embodiments, families of products may have prior translations leveraged, or any grouping of products for leverage translation may be used if desired, including leveraging translated strings for all products. In some embodiments, cross-leverage from other translation memories may be included.

To speed up query processing against TMX files, nodes in TMX files may be indexed by the database engine 324. Indexing provides a link between index entries and actual DOM (document object model) nodes in TMX files. In one embodiment, the database engine 324 can be built around fast path join algorithms to evaluate XPath expressions, while conventional approaches are typically based on top-down or bottom-up traversals of a document tree. The path join algorithms may outperform tree-traversal based implementations by an order of magnitude.

To provide facility whereby the underlying or base TM stored in database 314 can be used by other application/systems, database engine 324 may also provide facilities to use existing TM using web-services, such as SML-RPC 330 via XPATH 322, SOAP 334 and SML:DB at 336. XML:DB 336 can be used by other developers/programmers who wants to hook-in to the database engine 324.

Once the existing translation gets leveraged, as indicated at block 340 corresponding to partially translated TM, the remaining strings are marked as untranslated when the TMX is converted to XLIFF as indicated at 342. The converted XLIFF partially translated file is sent to translators 316 for translation over HTTP using XSLT processing 344. In one embodiment, XLIFF files are converted to HTML files using XSLT processing 344 which can be viewed over HTTP. To provide translator's a suitable interface, a web based XLIFF editor may be used. A suitable interface may include user interface constructs which make it easy for a translator to observe text and interface features of the product being localized to easily provide the localization. It may also provide a view of the text and user interface as it may actually appear while using the product.

Once the translation is done, it may be converted to TMX at 348. In one embodiment, the TMX file is stored in the TM repository, database 314. Next time when this process will be executed again, 100% leverage will be achieved as all the strings are lying translated in TM database 314.

In one embodiment, a process for localization processes resource files to produce a single consistent format XLIFF. The localization process is integrated with a source code management system and creates translation memories in the form of TMX. The translation memories are leveraged via a database engine designed for XML processing. The localization process provides for files being translated over a network without overload of sending and receiving, provides the ability by which other systems can also use the vast resource of translation memory using web-services. The localization process can indicate the localization readiness of source code and may be automated with the use of open-standards based practices and technologies and without dependency on any third-party tools. A further advantage of various embodiments is that localization becomes a combined effort of a localization team and a development team where cross-collaboration is enabled, allowing the best-practices to be implemented much before actual localization. What happens generally is that during localization, problems either due to problems in source code or problems in resource files may be eliminated before actual localization with the help of a localization check-list and automated pseudo localization.

Figure 4:
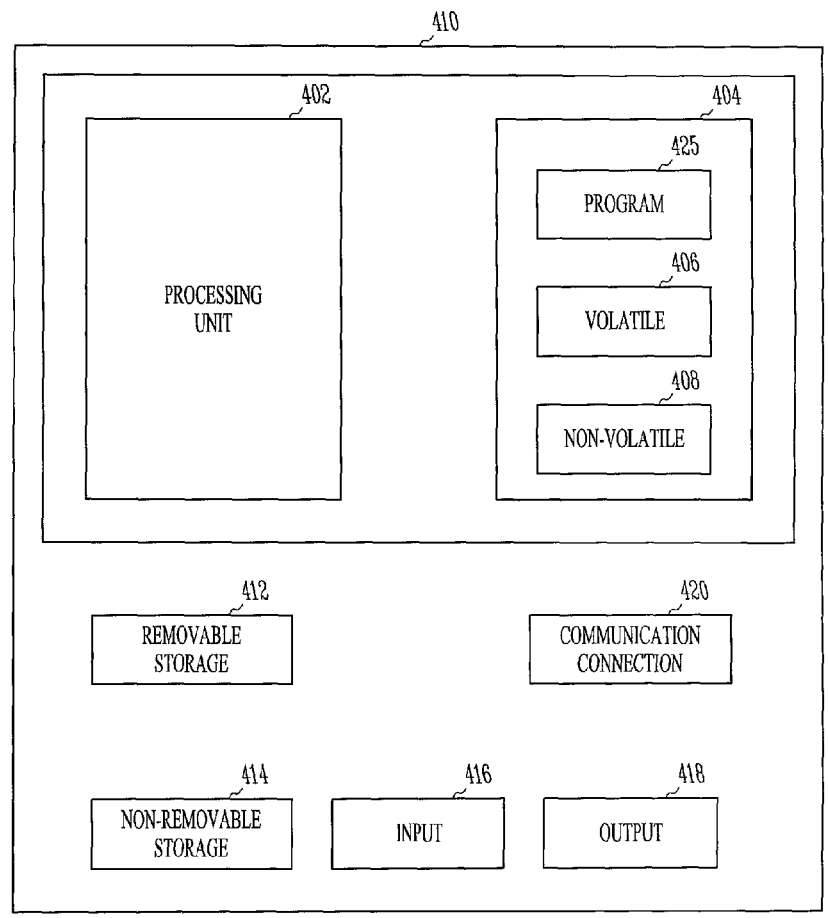
FIG. 4 is a block diagram of an example computer system for executing methods according to an example embodiment.

A block diagram of a computer system that executes programming for performing the above localization functions is shown in FIG. 4. A general computing device in the form of a computer 410, may include a processing unit 402, memory 404, removable storage 412, and non-removable storage 414. Memory 404 may include volatile memory 406 and non-volatile memory 408. Computer 410 may include—or have access to a computing environment that includes—a variety of computer-readable media, such as volatile memory 406 and non-volatile memory 408, removable storage 412 and non-removable storage 414. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 410 may include or have access to a computing environment that includes input 416, output 418, and a communication connection 420. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 402 of the computer 410. A hard drive, CD-ROM, and RAM are some examples of articles including a computer-readable medium.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A machine implemented method comprising:
checking resource files in a first format out of a source code management system;
converting the resource files to a Translation Memory eXchange (TMX) format;
leveraging prior stored translated strings to produce partially translated TMX resource files, the prior stored translated strings stored in a database;
marking untranslated strings of the partially translated TMX resource files as untranslated;
converting the partially translated TMX resource files to an eXtensible markup language Localization Interchange File Format (XLIFF) for transmission via a network to produce partially translated XLIFF resource files;
obtaining translations of the marked, untranslated strings via the network to complete translation of the partially translated XLIFF resource files and produce translated resource files;
converting the translations of the marked, untranslated strings to the TMX format;
storing the converted translated strings in the database;
converting the translated resource files back to the first format; and
checking the translated resource files in the first format back into the source code management system.

2. The method of claim 1 wherein obtaining translations comprises sending strings to an external service and receiving translated strings.

3. The method of claim 1 and further comprising providing a software localization kit that contains information identifying localizable files, their encoding, localizable content, and information related to the source code management system.

4. The method of claim 1 and further comprising creating a localization bundle of resource files.

5. The method of claim 4 wherein the bundle comprises a zip file containing a set of XLIFF files generated from different types of resource files.

6. The method of claim 1 wherein storing the translated strings in the database comprises indexing the translation strings.

7. The method of claim 1 wherein the database is built around fast path join algorithms to evaluate XPath expressions.

8. A system comprising:
a filter capable of accessing resource files from a source code management system;
a conversion module that converts the resource files to a Translation Memory Exchange (TMX) format;
a memory that stores already translated strings;
a module that leverages translated strings from the memory to produce partially translated TMX resource files and marks untranslated strings of the partially translated TMX resource files as untranslated;
wherein the filter converts the partially translated TMX resource files to an eXtensible markup language Localization Interchange File Format (XLIFF) for transmission via a network to produce partially translated XLIFF resource files;
a translation module that facilitates obtaining translations of the marked, untranslated strings via the network to complete translation of the partially translated XLIFF resource files and produce translated resource files;
wherein the conversion module converts the translations of the marked, untranslated strings to the TMX format and stores the converted translated strings in the memory;
wherein the filter converts the translated resource files back to the first format and checks the translated resource files back into the source code management system.

9. The system of claim 8 wherein the memory comprises a database built around fast path join algorithms to evaluate XPath expressions.

10. A non-transitory machine readable storage device comprising instructions stored thereon, which when executed by a machine, cause the machine to perform operations comprising:

checking resource files in a first format out of a source code management system;
converting the resource files to a Translation Memory eXchange (TMX) format;
leveraging prior stored translated strings to produce partially translated TMX resource files, the prior stored translated strings stored in a database;
marking untranslated strings of the partially translated TMX resource files as untranslated;
converting the partially translated TMX resource files to an eXtensible markup language Localization Interchange File Format (XLIFF) for transmission via a network to produce partially translated XLIFF resource files;
obtaining translations of the marked, untranslated strings via the network to complete translation of the partially translated XLIFF resource files and produce translated resource files;
converting the translations of the marked, untranslated strings to the TMX format;
storing the converted translated strings in the database;
converting the translated resource files back to the first format; and
checking the translated resource files in the first format back into the source code management system.

11. The storage device of claim 10, wherein the instructions for obtaining translations comprise instructions for sending strings to an external service and receiving translated strings.

12. The storage device of claim 10, further comprising instructions, which when executed by the machine, cause the machine to perform operations comprising creating a localization bundle of resource files.

13. The storage device of claim 12, wherein the bundle comprises a zip file containing a set of XLIFF files generated from different types of resource files.

14. The storage device of claim 10, wherein the instruction for storing the translated strings in the database comprise instructions for indexing the translation strings.

* * * * *